US011488603B2

(12) United States Patent
Tang et al.

(10) Patent No.: US 11,488,603 B2
(45) Date of Patent: Nov. 1, 2022

(54) METHOD AND APPARATUS FOR PROCESSING SPEECH

(71) Applicant: Beijing Baidu Netcom Science and Technology Co., Ltd., Beijing (CN)

(72) Inventors: Wanqi Tang, Beijing (CN); Jiamei Kang, Beijing (CN); Lixia Zeng, Beijing (CN); Yijing Zhou, Beijing (CN); Hanmei Xie, Beijing (CN); Lina Zhu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 400 days.

(21) Appl. No.: 16/711,310

(22) Filed: Dec. 11, 2019

(65) Prior Publication Data

US 2020/0388283 A1 Dec. 10, 2020

(30) Foreign Application Priority Data

Jun. 6, 2019 (CN) .......................... 201910490608.X

(51) Int. Cl.
*G10L 15/04* (2013.01)
*G10L 15/22* (2006.01)
*G10L 15/26* (2006.01)

(52) U.S. Cl.
CPC .............. *G10L 15/26* (2013.01); *G10L 15/04* (2013.01); *G10L 15/22* (2013.01); *G10L 2015/225* (2013.01)

(58) Field of Classification Search
CPC ......... G10L 15/04; G10L 15/22; G10L 15/26; G10L 2015/225
See application file for complete search history.

(56) References Cited

U.S. PATENT DOCUMENTS 5,812,974 A * 9/1998 Hemphill ................ G10L 15/18
704/E11.005
7,227,960 B2 * 6/2007 Kataoka ................ B25J 13/003
381/92

(Continued)

FOREIGN PATENT DOCUMENTS

CN 103543979 A 1/2014
CN 103647880 A * 3/2014

(Continued)

OTHER PUBLICATIONS

"A method for automatically clearing the blank in recording file," http://hi.baidu.com/1syy.

*Primary Examiner* — Lamont M Spooner
*Assistant Examiner* — Oluwadamilola M Ogunbiyi
(74) *Attorney, Agent, or Firm* — Kilpatrick Townsend & Stockton LLP

(57) ABSTRACT

Embodiments of the present disclosure provide a method and apparatus for processing a speech. The method may include: acquiring an original speech; performing speech recognition on the original speech, to obtain an original text corresponding to the original speech; associating a speech segment in the original speech with a text segment in the original text; recognizing an abnormal segment in the original speech and/or the original text; and processing a text segment indicated by the abnormal segment in the original text and/or the speech segment indicated by the abnormal segment in the original speech, to generate a final speech. A speech segment in the original speech is associated with a text segment in the original text to realize visual processing of the speech.

17 Claims, 7 Drawing Sheets

(56) References Cited

U.S. PATENT DOCUMENTS

| | | | | |
|---|---|---|---|---|
| 7,319,959 B1* | 1/2008 | Watts | | G10L 15/16 |
| | | | | 704/254 |
| 10,394,963 B2* | 8/2019 | Erickson | | G06F 40/253 |
| 10,579,835 B1* | 3/2020 | Phillips | | G06F 40/211 |
| 10,803,858 B2* | 10/2020 | Nagao | | G10L 15/26 |
| 11,245,950 B1* | 2/2022 | Mahar | | H04N 21/4307 |
| 2001/0056344 A1* | 12/2001 | Ramaswamy | | G10L 15/22 |
| | | | | 704/235 |
| 2004/0197750 A1* | 10/2004 | Donaher | | G09B 7/00 |
| | | | | 434/236 |
| 2006/0095262 A1* | 5/2006 | Danieli | | G10L 21/00 |
| | | | | 704/E21.001 |
| 2009/0281807 A1* | 11/2009 | Hirose | | G10L 21/003 |
| | | | | 704/E15.005 |
| 2010/0169096 A1* | 7/2010 | Lv | | H04L 51/066 |
| | | | | 704/260 |
| 2011/0144993 A1* | 6/2011 | Ruby | | G10L 17/26 |
| | | | | 704/E15.005 |
| 2012/0072217 A1* | 3/2012 | Bangalore | | G10L 15/1807 |
| | | | | 704/243 |
| 2012/0323570 A1* | 12/2012 | Deshmukh | | G10L 21/0364 |
| | | | | 704/224 |
| 2013/0182147 A1* | 7/2013 | Kimoto | | H04N 5/76 |
| | | | | 348/231.3 |
| 2014/0088968 A1* | 3/2014 | Chen | | G10L 13/04 |
| | | | | 704/254 |
| 2016/0314781 A1* | 10/2016 | Schultz | | A61B 5/394 |
| 2017/0235729 A1* | 8/2017 | Hughes | | G06F 16/48 |
| | | | | 707/758 |
| 2017/0310820 A1* | 10/2017 | Kao | | G10L 25/63 |
| 2017/0364508 A1* | 12/2017 | Abrahams | | G06N 5/022 |
| 2018/0130471 A1* | 5/2018 | Trufinescu | | G06F 9/453 |
| 2018/0136794 A1* | 5/2018 | Cassidy | | G06F 40/274 |
| 2018/0181561 A1* | 6/2018 | Raanani | | G10L 15/1822 |
| 2018/0233127 A1* | 8/2018 | Visser | | G10L 13/047 |
| 2018/0308487 A1* | 10/2018 | Goel | | G10L 15/1815 |
| 2019/0244617 A1* | 8/2019 | Bastide | | A61M 21/00 |
| 2019/0312973 A1* | 10/2019 | Engelke | | G10L 15/26 |
| 2019/0355351 A1* | 11/2019 | Kim | | B60W 50/087 |
| 2019/0378499 A1* | 12/2019 | Miller | | G06F 3/167 |
| 2020/0090393 A1* | 3/2020 | Shin | | G06V 40/174 |
| 2020/0193264 A1* | 6/2020 | Zavesky | | G06N 20/00 |
| 2020/0342860 A1* | 10/2020 | Ju | | G10L 15/26 |

FOREIGN PATENT DOCUMENTS

| | | | | |
|---|---|---|---|---|
| CN | 103811012 A | | 5/2014 | |
| CN | 104157301 A | | 11/2014 | |
| CN | 106357929 A | | 1/2017 | |
| CN | 106373558 A | | 2/2017 | |
| CN | 109524027 A | | 3/2019 | |
| CN | 109801648 A | | 5/2019 | |
| CN | 112349266 A * | | 2/2021 | G06N 3/0445 |
| GB | 2326516 A * | | 12/1998 | G11B 27/034 |
| JP | 4048473 B2 * | | 2/2008 | |
| WO | WO-2016043322 A1 * | | 3/2016 | G10L 13/10 |
| WO | WO-2017150103 A1 * | | 9/2017 | G10L 21/003 |
| WO | WO-2020206455 A1 * | | 10/2020 | G06N 3/0445 |

* cited by examiner

METHOD AND APPARATUS FOR PROCESSING SPEECH

CROSS-REFERENCE TO RELATED APPLICATIONS

This application claims priority to Chinese Patent Application No. 201910490608.X, filed with the China National Intellectual Property Administration (CNIPA) on Jun. 6, 2019, the content of which is incorporated herein by reference in its entirety.

TECHNICAL FIELD

Embodiments of the present disclosure relate to the field of computer technology, and specifically to a method and apparatus for processing a speech.

BACKGROUND

Instant Message (IM) is the current most popular communication method on the Internet, and can realize instant sending and receiving information. Currently, most of mobile terminals are installed with instant message applications. The instant message applications support the interaction of information in the format of text, picture, speech, video or the like. For speech interaction, the speech recorded by a user is often directly sent to a receiving user.

However, in the process of speech recording, abnormal situations would inevitably occur. For example, the sending user has a language expression defect (for example, stammer), or stops to think about the content of the speech during the speech recording process. Usually, when an abnormal situation occurs, the sending user is required to re-record the speech and then re-send the speech to the receiving user.

SUMMARY

Embodiments of the present disclosure provides a method and apparatus for processing a speech.

According to a first aspect, some embodiments of the present disclosure provide a method for processing a speech, including: acquiring an original speech; performing speech recognition on the original speech, to obtain an original text corresponding to the original speech; associating a speech segment in the original speech with a text segment in the original text; recognizing an abnormal segment in at least one of the original speech or the original text; and processing at least one of a text segment indicated by the abnormal segment in the original text or the speech segment indicated by the abnormal segment in the original speech, to generate a final speech.

In some embodiments, the performing speech recognition on the original speech to obtain an original text corresponding to the original speech includes: in response to the original speech including at least one of a blank speech segment or an elongated tone speech segment, recognizing the blank speech segment as a first preset symbol, and/or recognizing the elongated tone speech segment as a second preset symbol.

In some embodiments, the blank speech segment is a speech segment in the original speech a sound intensity thereof is smaller than a preset intensity, does not contain human characteristic acoustic waves, and a duration thereof is longer than a first preset duration; and the elongated tone speech segment is a speech segment in the original speech a sound intensity thereof is not smaller than the preset intensity, does not contain a semantic content, and a duration thereof is longer than a second preset duration.

In some embodiments, the recognizing the blank speech segment as a first preset symbol, and/or recognizing the elongated tone speech segment as a second preset symbol includes: determining, based on the ratio of a duration of the blank speech segment to the first preset duration, a number of the first preset symbol recognized from the blank speech segment; and/or determining, based on the ratio of a duration of the elongated tone speech segment to the second preset duration, a number of the second preset symbol recognized from the elongated tone speech segment.

In some embodiments, the processing at least one of a text segment indicated by the abnormal segment in the original text or the speech segment indicated by the abnormal segment in the original speech to generate a final speech includes: deleting at least part of the text segment indicated by the abnormal segment in the original text, and synchronously deleting at least part of the speech segment in the original speech associated with the deleted at least part of the text segment, to generate the final speech.

In some embodiments, the deleting at least part of the text segment indicated by the abnormal segment in the original text includes: deleting, in response to the original text including at least one of the first preset symbol or the second preset symbol, at least one of the first preset symbol or the second preset symbol from the original text; and deleting, in response to the original text including a word repeated more than a preset number of times, the words except the word at a preset position from the original text.

In some embodiments, after generating the final speech, the method further includes: smoothing the final speech.

In some embodiments, smoothing the final speech includes: determining, based on the speech feature of the final speech, a dialect category corresponding to the final speech; and correcting, based on the dialect category corresponding to the final speech, syllables in the final speech, and adjusting accents of the final speech.

In some embodiments, the smoothing the final speech includes: determining, based on the volume and accents of the final speech, an emotion level corresponding to the final speech; and adjusting, based on the emotion level corresponding to the final speech, the speech rate, tone and accents of the final speech.

In some embodiments, the method further includes: synchronously revising, in response to detecting a revision operation on at least part of the text segment in the original text, at least part of the speech segment in the original speech associated with the revised at least part of the text segment.

In some embodiments, the original speech is sent by a first user in an instant message application; and the method further includes: sending the final speech to a server of the instant message application, so that the server of the instant message application sends the final speech to a second user of the instant message application.

According to a second aspect, some embodiments of present disclosure provide an apparatus for processing a speech, includes: an acquiring unit, configured to acquire an original speech; a first recognizing unit, configured to perform speech recognition on the original speech, to obtain an original text corresponding to the original speech; an associating unit, configured to associate a speech segment in the original speech with a text segment in the original text; a second recognizing unit, configured to recognize an abnormal segment in at least one of the original speech or the original text; and a processing unit, configured to process at least one of a text segment indicated by the abnormal segment in the original text or the speech segment indicated by the abnormal segment in the original speech, to generate a final speech.

In some embodiments, the first recognizing unit is further configured to: in response to the original speech including at least one of a blank speech segment or an elongated tone speech segment, recognize the blank speech segment as a first preset symbol, and/or recognize the elongated tone speech segment as a second preset symbol.

In some embodiments, the blank speech segment is a speech segment in the original speech a sound intensity thereof is smaller than a preset intensity, does not contain human characteristic acoustic waves, and a duration thereof is longer than a first preset duration; and the elongated tone speech segment is a speech segment in the original speech a sound intensity thereof is not smaller than the preset intensity, does not contain a semantic content, and a duration thereof is longer than a second preset duration.

In some embodiments, the first recognizing unit is further configured to: determine, based on the ratio of a duration of the blank speech segment to the first preset duration, a number of the first preset symbol recognized from the blank speech segment; and/or determine, based on the ratio of a duration of the elongated tone speech segment to the second preset duration, a number of the second preset symbol recognized from the elongated tone speech segment.

In some embodiments, the processing unit is further configured to: delete at least part of the text segment indicated by the abnormal segment in the original text, and synchronously delete at least part of the speech segment in the original speech associated with the deleted at least part of the text segment, to generate the final speech.

In some embodiments, the processing unit is further configured to: delete, in response to the original text including at least one of the first preset symbol or the second preset symbol, at least one of the first preset symbol or the second preset symbol from the original text; and delete, in response to the original text including a word repeated more than a preset number of times, the words except the word at a preset position from the original text.

In some embodiments, the apparatus further includes a smoothing unit, configured to: smooth the final speech.

In some embodiments, the smoothing unit is further configured to: determine, based on the speech feature of the final speech, a dialect category corresponding to the final speech; and correct, based on the dialect category corresponding to the final speech, syllables in the final speech, and adjust accents of the final speech.

In some embodiments, the smoothing unit is further configured to: determine, based on the volume and accents of the final speech, an emotion level corresponding to the final speech; and adjust, based on the emotion level corresponding to the final speech, the speech rate, tone and accents of the final speech.

In some embodiments, the apparatus further includes a revision unit, configured to: synchronously revise, in response to detecting a revision operation on at least part of the text segment in the original text, at least part of the speech segment in the original speech associated with the revised at least part of the text segment.

In some embodiments, the original speech is sent by a first user in an instant message application; and the method further includes: sending the final speech to a server of the instant message application, so that the server of the instant message application sends the final speech to a second user of the instant message application.

According to a third aspect, some embodiments of present disclosure provide a terminal device, the terminal device includes: one or more processors; and a storage apparatus, storing one or more programs, the one or more programs, when executed by the one or more processors, causing the one or more processors to implement the method according to any one of the implementations of the first aspect.

According to a fourth aspect, some embodiments of present disclosure provide computer-readable medium, storing a computer program thereon, the computer program, when executed by a processor, causes the processor to implement the method according to anyone of the implementations of the first aspect.

The method and apparatus for processing a speech provided by some embodiments of the present disclosure, performs speech recognition on the acquired original voice to obtain an original text corresponding to the original speech; and then associate a speech segment in the original speech with a text segment in the original text; recognize an abnormal segment in the original speech and/or the original text; process a text segment indicated by the abnormal segment in the original text and/or the speech segment indicated by the abnormal segment in the original speech, to generate a final speech. By associating By associating a speech segment in the original speech with a text segment in the original text, visual processing of the speech is achieved. At the same time, the problem of re-recording due to an abnormal situation during speech recording is avoided, thereby improving the efficiency of speech recording.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the some embodiments in the present disclosure and some features in the disclosure may be combined with each other on a non-conflict basis. Features of the present disclosure will be described below in detail with reference to the accompanying drawings and in combination with embodiments.

Figure 1:
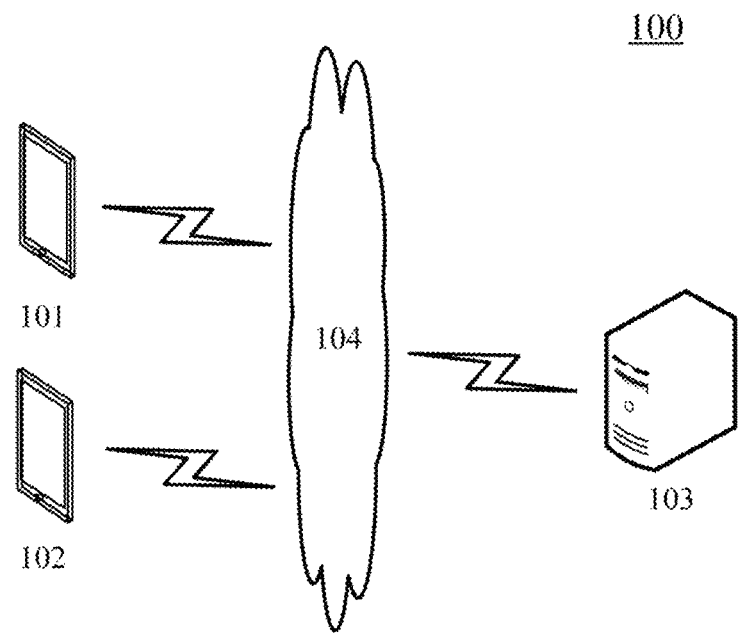
FIG. 1 is an illustrative system architecture to which embodiments of the present disclosure may be applied.

FIG. 1 shows an example system architecture 100 in which a method for processing a speech or an apparatus for processing a speech may be implemented.

As shown in FIG. 1, the system architecture 100 may include electronic terminal devices 101, 102 and 103 and a network 104. The network 104 serves as a medium providing a communication link between the electronic terminal devices 101, 102 and 103. The network 104 may include various types of connections, such as wired or wireless communication links, or optical fiber cables.

The electronic terminal device 101, 102 or 103 may be a hardware device or software supporting network connections so as to provide various network services. When the device is hardware, the device may be various electronic devices, including but not limited to a smart phone, a tablet computer, a laptop computer, a desktop computer, a server, etc. The hardware device may be implemented as a distributed device group composed of a plurality of devices, or as a single device. When the device is software, the device may be installed in the above-listed electronic devices. The software may be implemented, for example, as a plurality of software programs or software modules for providing distributed services, or as a single software program or software module. Specific limitations are not provided herein.

In practice, the device may provide a corresponding network service by installing a corresponding client application or server application. After installed with the client application, the device may be embodied as a client in network communication. Accordingly, after installed with the server application, the device may be embodied as a server in network communication.

As an example, in FIG. 1, the electronic terminal devices 101 and 102 are embodied as clients, and the device 103 is embodied as a server. Specifically, the electronic terminal device 101 or 102 may be a client installed with an instant message application, and the device 103 may be a server of the instant message application. The electronic terminal device 101 may acquire an original speech; perform speech recognition on the original speech to obtain an original text corresponding to the original speech; associate a speech segment in the original speech with a text segment in the original text; recognize an abnormal segment in the original speech and/or the original text; process a text segment indicated by the abnormal segment in the original text and/or a speech segment indicated by the abnormal segment in the original speech, to generate a final speech; and send the final speech to the device 103. The device 103 may send the final speech to the electronic terminal device 102.

It should be noted that the method for processing a speech according to some embodiments of the present disclosure may be performed by the electronic terminal device 101.

It should be appreciated that the numbers of the network and the devices in FIG. 1 are merely illustrative. Any number of networks and devices may be provided based on implementation requirements.

Figure 2:
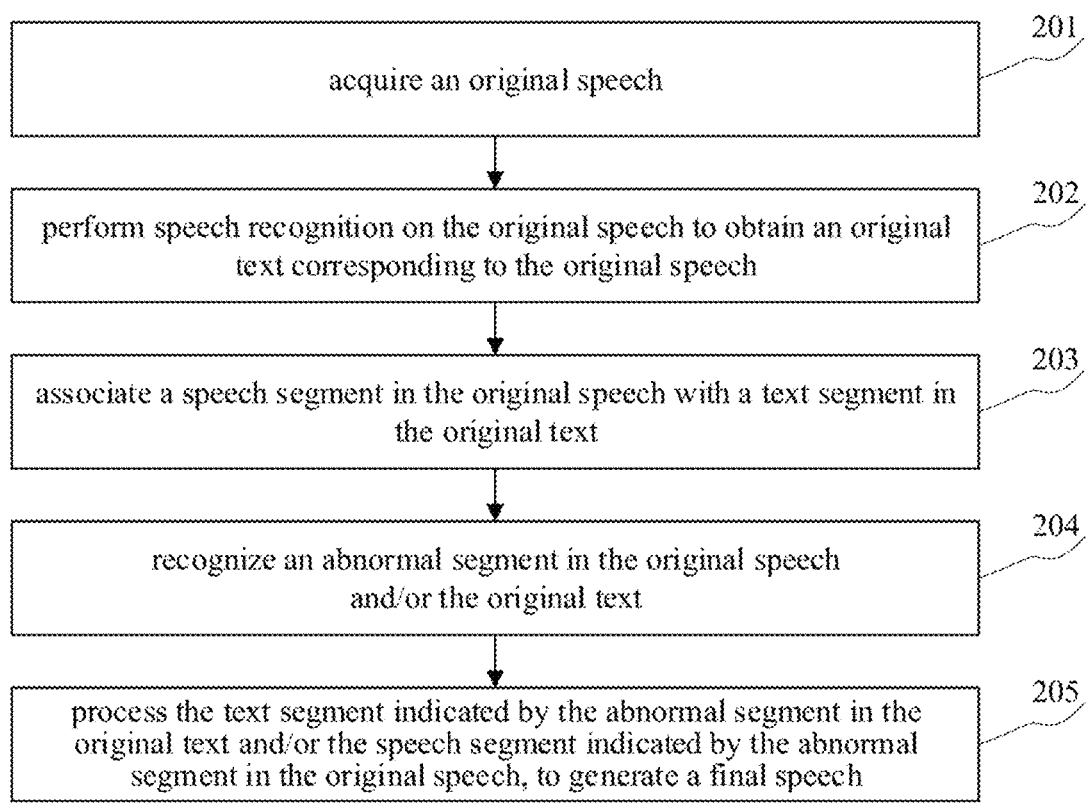
FIG. 2 is a flowchart of a method for processing a speech according to an embodiment of the present disclosure.

Further referring to FIG. 2, a flow 200 of a method for processing a speech according to an embodiment of the present disclosure is shown. The method for processing a speech includes following steps.

Step 201: acquiring an original speech.

In the present embodiment, the executing body (for example, the electronic terminal device 101 shown in FIG. 1) of the method for processing a speech may acquire the original speech. Generally, the executing body has a speech recording function to record the original speech.

Step 202: performing speech recognition on the original speech, to obtain an original text corresponding to the original speech.

In the present embodiment, the executing body may perform speech recognition on the original speech to obtain the original text corresponding to the original speech. Generally, the executing body may extract a feature vector of the original speech, and recognize the feature vector of the original speech by using a recognition engine, to obtain the original text corresponding to the original speech.

In some optional implementations of the present embodiment, when the original speech includes a blank speech segment and/or an elongated tone speech segment, the executing body may recognize the blank speech segment as a first preset symbol (e.g., an ellipsis), and/or recognize the elongated tone speech segment as a second preset symbol (e.g., a long transverse line). Generally, the executing body may recognize the blank speech segments and/or the elongated tone speech segments in the original speech by using an acoustic model. The blank speech segment may be a speech segment in the original speech whose sound intensity is smaller than a preset intensity (for example, 15 decibels), does not contain human characteristic acoustic waves, and has a duration longer than a first preset duration (for example, 1 second). The elongated tone speech segment may be a speech segment in the original speech whose sound intensity is not smaller than a preset intensity, does not contain a semantic content, and has a duration longer than a second preset duration (for example, 0.5 second).

In some optional implementations of the present embodiment, the executing body may determine, based on the ratio of the duration of a blank speech segment to the first preset duration, the number of the first preset symbol recognized from the blank speech segment; and/or determine, based on the ratio of the duration of an elongated tone speech segment to the second preset duration, the number of the second preset symbol recognized from the elongated tone speech segment. For example, every 1 second in a blank speech segment is identified as an ellipsis. Every 0.5 second in an elongated tone speech segment is recognized as a long transverse line.

Step 203: associating a speech segment in the original speech with a text segment in the original text.

In the present embodiment, the executing body may associate the speech segments in the original speech with the text segments in the original text. Generally, the executing body may cut the original speech into frames to obtain a plurality of speech segments, and associate each speech segment with a corresponding text segment in the original text. Thus, as long as one of the original speech and the original text is processed, both the original speech and the original text are processed synchronously.

Step 204: recognizing an abnormal segment in the original speech and/or the original text.

In the present embodiment, the executing body may recognize an abnormal segment in the original speech and/or the original text. The abnormal segment may include, but are not limited to, at least one of the following: a blank segment, a repeated segment, an elongated tone speech segment, etc.

Step 205: processing a text segment indicated by the abnormal segment in the original text and/or the speech segment indicated by the abnormal segment in the original speech, to generate a final speech.

In the present embodiment, the executing body may process the text segment indicated by the abnormal segment in the original text and/or the speech segment indicated by the abnormal segment in the original speech to generate a final speech. For example, the executing body may first delete at least part of the text segment indicated by the abnormal segment in the original text, to generate a final text; and then perform speech synthesis on the final text to generate the final speech.

According to the method for processing a speech provided by some embodiments of the present disclosure, the acquired original speech is first recognized to obtain an original text corresponding to the original speech; a speech segment in the original speech is associated with a text segment in the original text; then an abnormal segment in the original speech and/or the original text is recognized; and the text segment indicated by the abnormal segment in the original text and/or the speech segment indicated by the abnormal segment in the original speech are/is finally processed to generate a final speech. By associating a speech segment in the original speech with a text segment in the original text, visual processing of the speech is achieved. At the same time, the problem of re-recording due to an abnormal situation during speech recording is avoided, thereby improving the efficiency of speech recording.

Figure 3:
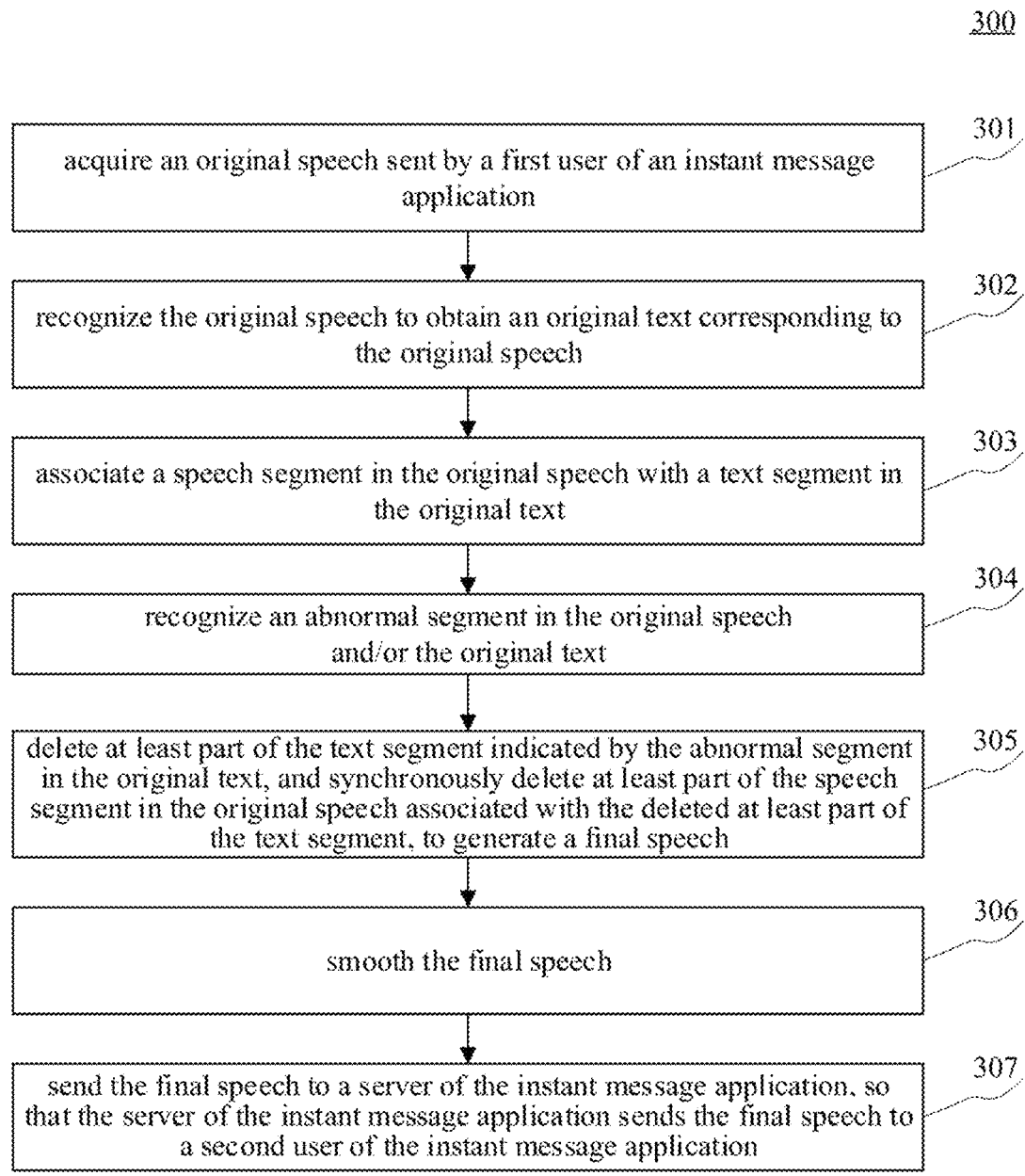
FIG. 3 is a flowchart of the method for processing a speech according to another embodiment of the present disclosure.

Further referring to FIG. 3, a flow 300 of the method for processing a speech according to another embodiment of the present disclosure is shown. The method for processing a speech includes the following steps.

Step 301: acquiring an original speech sent by a first user of an instant message application.

In the present embodiment, the executing body (for example, the electronic terminal device 101 shown in FIG. 1) of the method for processing a speech may acquire the original speech sent by the first user of the instant message application. The executing body may be installed with the instant message application.

Step 302: performing voice recognition on the original speech, to obtain an original text corresponding to the original speech.

Step 303: associating a speech segment in the original speech with a text segment in the original text.

Step 304: recognizing an abnormal segment in the original speech and/or the original text.

In the present embodiment, the specific operations of steps 302-304 have been described in detail in steps 202-204 in the embodiment shown in FIG. 2, and details are not described herein again.

Step 305: deleting at least part of the text segment indicated by the abnormal segment in the original text, and synchronously deleting at least part of the speech segment in the original speech associated with the deleted at least part of the text segment, to generate a final speech.

In the present embodiment, the executing body may delete at least part of the text segment indicated by the abnormal segment in the original text. Since the speech segments in the original speech are associated with the text segments in the original text, when deleting at least part of the text segment indicated by the abnormal segment in the original text, the executing body may synchronously delete at least part of the speech segment in the original speech associated with the deleted at least part of the text segment. Subsequently, the executing body may generate a final speech based on the original speech after the deletion processing. Generally, when the abnormal segment is a blank segment or an elongated segment, the executing body deletes the text segment indicated by the abnormal segment in the original text, and synchronously deletes the speech segment in the original speech associated with the deleted text segment. When the abnormal segment is a repeated segment, the executing body deletes the part of the text segment indicated by the abnormal segment in the original text, and synchronously deletes the part of the speech segment in the original speech associated with the deleted part of the text segment.

In some optional implementations of the present embodiment, when the original text includes a first preset symbol and/or a second preset symbol, it indicates that the original text includes a blank text segment and/or an elongated tone text segment. In this case, the executing body may delete the first preset symbol and/or the second preset symbol from the original text.

In some optional implementations of the present embodiment, when the original text includes a word repeated more than a preset number of times (for example, 4 times), it indicates that the original text includes repeated text segments. At this time, the executing body may delete the words except the word at a preset position (for example, the last word among the repeated text segments) from the original text.

In some optional implementations of the present embodiment, in response to detecting a revision operation on at least part of a text segment in the original text, the executing body synchronously revises at least part of the speech segment in the original speech associated with the revised at least part of the text segment.

Step 306: smoothing the final speech.

In the present embodiment, the executing body may smooth the final speech, to make the final speech more natural.

In some optional implementations of the present embodiment, the executing body may first determine, based on the speech feature of the final speech, a dialect category corresponding to the final speech; then correct, based on the dialect category corresponding to the final speech, syllables in the final speech, and adjust accents of the final speech. Generally, the executing body may match the speech feature of the final speech with the speech features of the dialects of various categories in a dialect library, and determine the dialect category corresponding to the final speech based on the matching result.

In some optional implementations of the present embodiment, the executing body may first determine, based on the volume and accents of the final speech, an emotion level corresponding to the final speech; and then adjust, based on the emotion level corresponding to the final speech, the speech rate, tone and accents of the final speech. Generally, the higher the emotion level is, the higher the speech rate is, the more the accents are, and the higher the sound intensity is. For example, the emotion level may be divided into 5 levels. For the first emotion level, the speech rate is 0.5 times the normal speech rate, the accents are fewest, and the sound intensity is 10% lower than the normal sound intensity. For the third emotion level, the speech rate is the normal speech rate, the amount of accents is moderate, and the sound intensity is the normal sound intensity. For the fifth emotion level, the speech rate is 1.5 times the normal speech rate, the accents are maximum, and the sound intensity is 10% higher than the normal sound intensity.

Step 307: sending the final speech to a server of the instant message application, so that the server of the instant message application sends the final speech to a second user of the instant message application.

In the present embodiment, the executing body may send the final speech to the server (for example, the device 103 shown in FIG. 1) of the instant message application. In this way, the server of the instant message application may send the final speech to the second user of the instant message application.

Figure 4A:
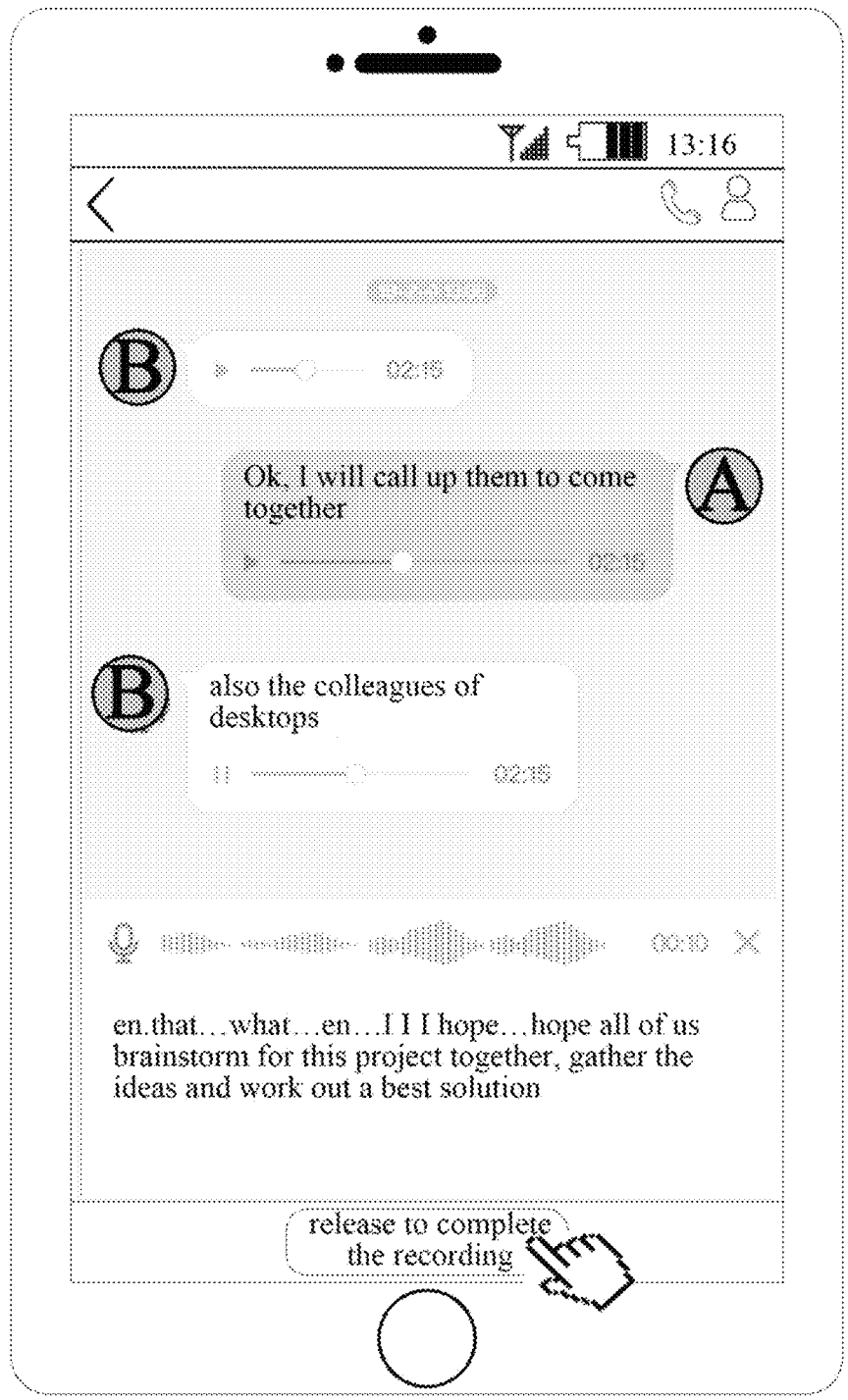
FIG. 4A is a schematic diagram of an original speech and an original text in an input interface.
Figure 4B:
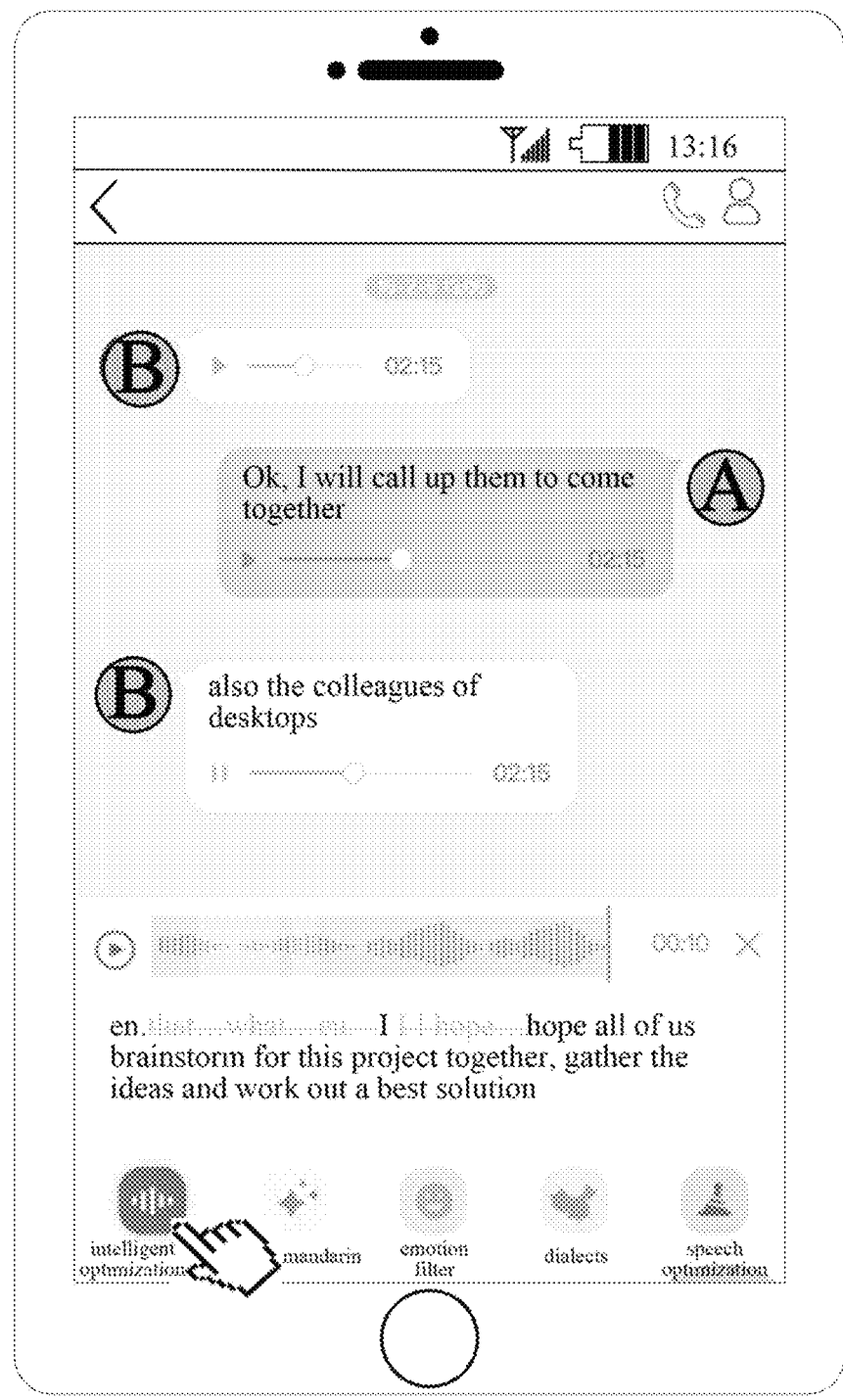
FIG. 4B is a schematic diagram of the processing of the original speech and the original text.
Figure 4C:
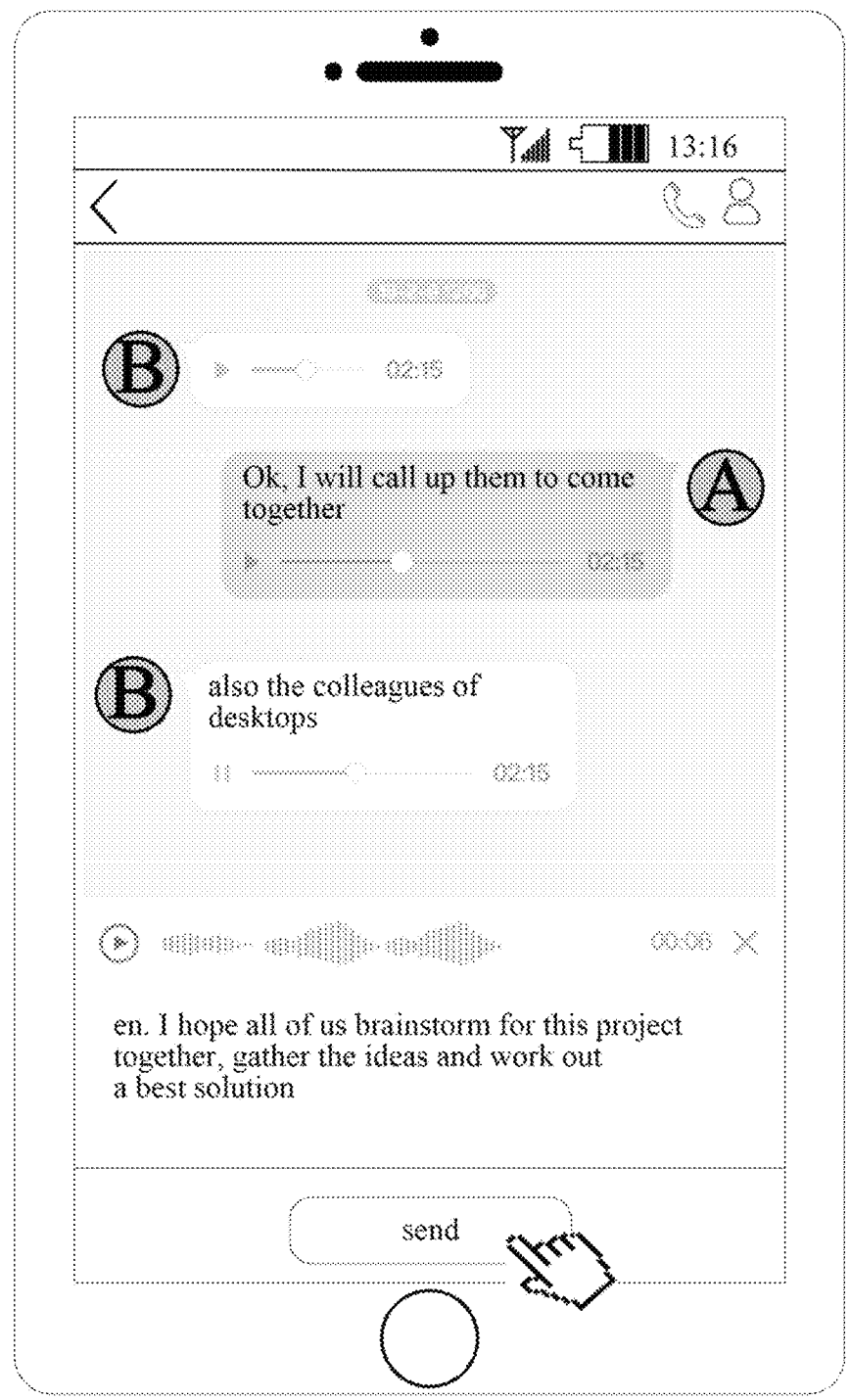
FIG. 4C is a schematic diagram of a final speech and a final text in the input interface.
Figure 4D:
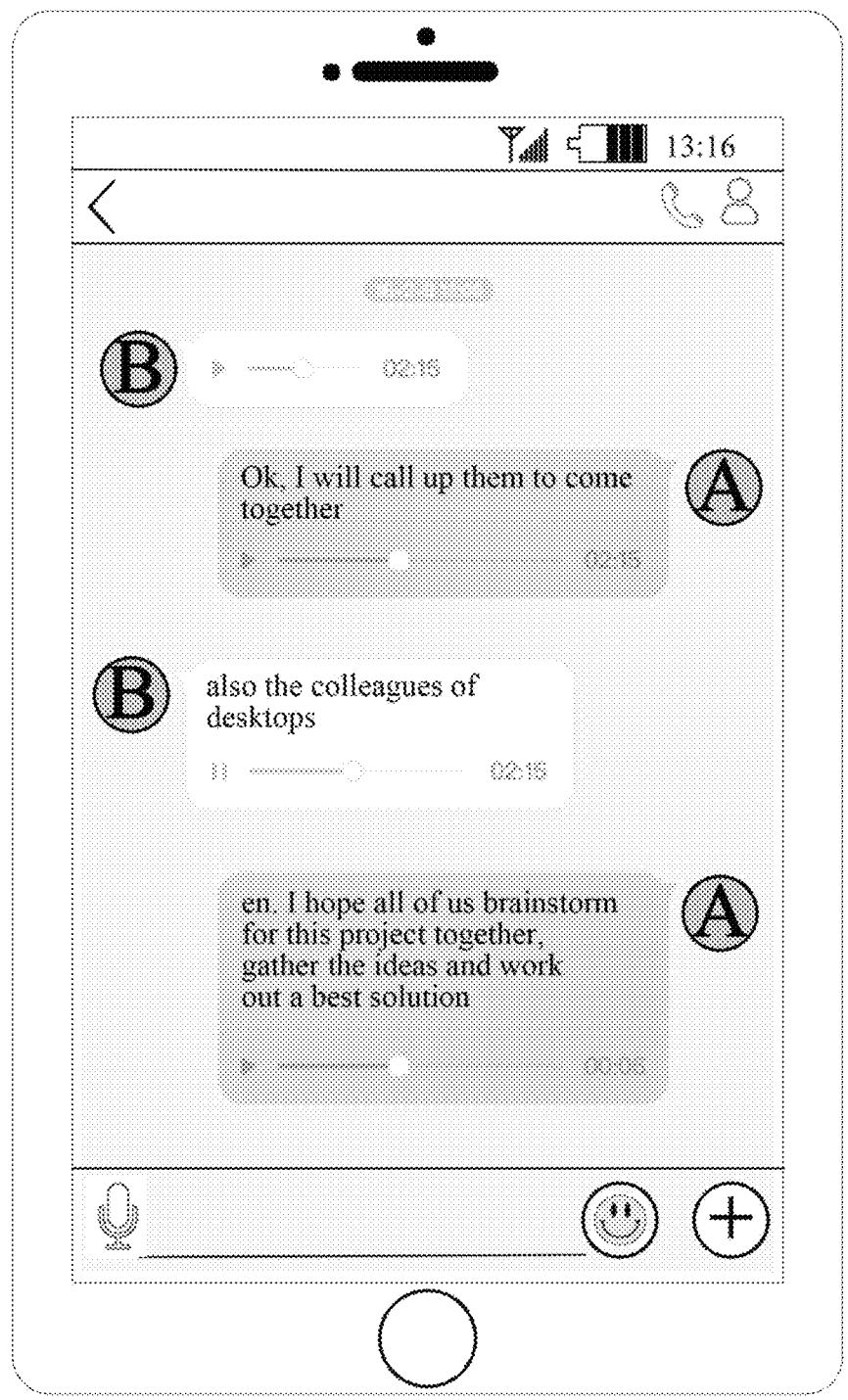
FIG. 4D is a schematic diagram of the final speech in a chat interface.

Some embodiments of the present disclosure further provide an application scenario of the method for processing a speech. In the application scenario, mobile phones of a user A and a user B are installed with an instant message application. The mobile phone of the user A runs the instant message application to open a chat session page with the user B. The chat session page includes an input interface and a chat interface. The user A clicks a speech recording control to record an original speech sent by a first user. At the same time, the original speech is recognized to obtain an original text corresponding to the original speech. Here, blank speech segments in the original speech are recognized as ellipses. Speech segments in the original speech are associated with text segments in the original text. Specifically, FIG. 4A shows a schematic diagram of the original speech and the original text in the input interface. The user A then clicks an intelligent optimization control to recognize abnormal segments in the original text. At least part of the text segments indicated by the abnormal segments in the original text are deleted, and at least part of the speech segments in the original speech associated with the deleted at least part of the text segments are simultaneously deleted. Specifically, FIG. 4B shows a schematic diagram of the processing of the original speech and the original text. The user then clicks an optimization completion control, to generate a final speech and a final text. Specifically, FIG. 4C shows a schematic diagram of the final speech and final text in the input interface. Finally, the user clicks a send control to send the final speech to the server of the instant message application. The server of the instant message application sends the final speech to the user B. At this time, the final speech is displayed in the chat interfaces of both the user A and the user B. Specifically, FIG. 4D shows a schematic diagram of output of the final speech in the chat interface.

It can be seen from FIG. 3 that, compared with the corresponding embodiment of FIG. 2, the flow 300 of the method for processing a speech in the present embodiment highlights the steps of processing. In the solution described by some embodiments of the present disclosure, when the content in the original text is deleted, the corresponding content in the original speech is synchronously deleted, to realize visual processing of the speech. In addition, the final speech obtained by synchronously deleting the corresponding content from the original speech is smoothed, so that the final speech is more natural. Moreover, the method for processing a speech is applied in the speech interaction process of the instant message application to improve the communication efficiency.

Figure 5:
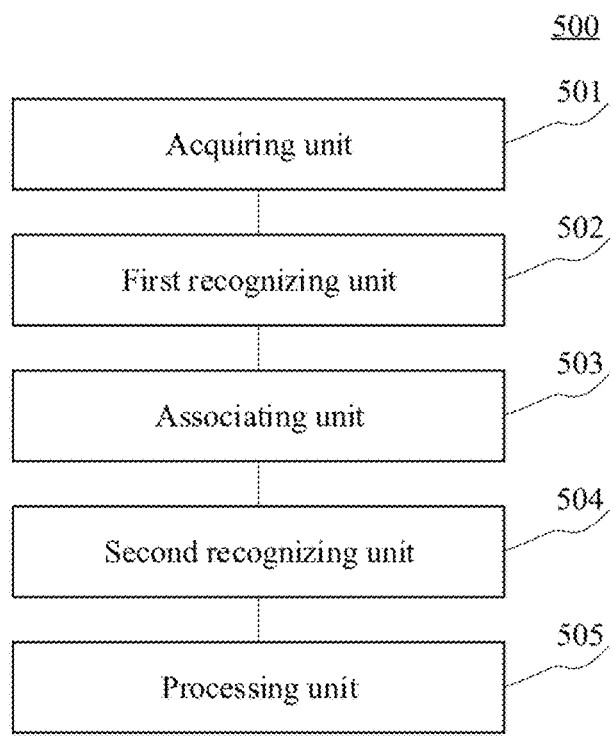
FIG. 5 is a schematic structural diagram of an apparatus for processing a speech according to an embodiment of the present disclosure.

With further reference to FIG. 5, as an implementation of the method shown in the above figures, an embodiment of the present disclosure provides an apparatus for processing a speech. The embodiment of the apparatus corresponds to the embodiment of the method shown in FIG. 2, and the apparatus may be applied to various electronic devices.

As shown in FIG. 5, the apparatus 500 for processing a speech according to the present embodiment includes: an acquiring unit 501, a first recognizing unit 502, an associating unit 503, a second recognizing unit 504, and a processing unit 505. The acquiring unit 501 is configured to acquire an original speech; the first recognizing unit 502 is configured to perform speech recognition on the original speech, to obtain an original text corresponding to the original speech; the associating unit 503 is configured to associate a speech segment in the original speech with a text segment in the original text; the second recognizing unit 504 is configured to recognize an abnormal segment in the original speech and/or the original text; and the processing unit 505 is configured to process a text segment indicated by the abnormal segment in the original text and/or the speech segment indicated by the abnormal segment in the original speech, to generate a final speech.

In the present embodiment, the specific processing of the acquiring unit 501, the first recognizing unit 502, the associating unit 503, the second recognizing unit 504, and the processing unit 505 of the apparatus 500 for processing a speech and the technical effects thereof may be referred to the related description in step 201, step 202, step 203, step 204, and step 205 in the corresponding embodiment of FIG. 2, respectively. The description will not be repeated here.

In some optional implementations of the present embodiment, the first recognizing unit 502 is further configured to: recognize, in response to the original speech including a blank speech segment and/or an elongated tone speech segment, the blank speech segment as a first preset symbol, and/or recognize the elongated tone speech segment as a second preset symbol.

In some optional implementations of the present embodiment, the blank speech segment is a speech segment in the original speech the sound intensity thereof is smaller than a preset intensity, does not contain human characteristic acoustic waves, and a duration thereof is longer than a first preset duration; and the elongated tone speech segment is a speech segment in the original speech the sound intensity thereof is not smaller than the preset intensity, does not contain a semantic content, and a duration thereof is longer than a second preset duration.

In some optional implementations of the present embodiment, the first recognizing unit 502 is further configured to: determine, based on the ratio of the duration of the blank speech segment to the first preset duration, the number of the first preset symbol recognized from the blank speech segment; and/or determine, based on the ratio of the duration of the elongated tone speech segment to the second preset duration, the number of the second preset symbol recognized from the elongated tone speech segment.

In some optional implementations of the present embodiment, the processing unit 505 is further configured to: delete at least part of the text segment indicated by the abnormal segment in the original text, to generate a final text; and perform speech synthesis on the final text to generate the final speech.

In some optional implementations of the present embodiment, the processing unit 505 is further configured to: delete at least part of the text segment indicated by the abnormal segment in the original text, and simultaneously delete at least part of the speech segment in the original speech associated with the deleted at least part of the text segment, to generate the final speech.

In some optional implementations of the present embodiment, the processing unit 505 is further configured to: delete, in response to the original text including the first preset symbols and/or the second preset symbols, the first preset symbol and/or the second preset symbol from the original text; and delete, in response to the original text including a word repeated more than a preset number of times, the words except the word at a preset position from the original text.

In some optional implementations of the present embodiment, the apparatus 500 for processing a speech may further include a smoothing unit (not shown) configured to smooth the final speech.

In some optional implementations s of the present embodiment, the smoothing unit is further configured to: determine, based on the speech feature of the final speech, a dialect category corresponding to the final speech; correct, based on the dialect category corresponding to the final speech, syllables in the final speech, and adjust accents of the final speech.

In some optional implementations of the present embodiment, the smoothing unit is further configured to: determine, based on the volume and accents of the final speech, an emotion level corresponding to the final speech; and adjust, based on the emotion level corresponding to the final speech, the speech rate, tone and accents of the final speech.

In some optional implementations of the present embodiment, the apparatus 500 for processing a speech further includes: a revision unit (not shown) configured to synchronously revise, in response to detecting a revision operation on at least part of the text segment in the original text, at least part of the speech segment in the original speech associated with the revised at least part of the text segment.

In some optional implementations of the present embodiment, the original speech is sent by a first user in an instant message application; and the apparatus 500 for processing a speech further includes: a sending unit (not shown) configured to send the final speech to a server of the instant message application, so that the server of the instant message application sends the final speech to a second user of the instant message application.

Hereinafter, referring to FIG. 6, a schematic structural diagram of a computer system 600 adapted to implement a terminal device (for example, the electronic terminal device 101 shown in FIG. 1) of the embodiments of the present disclosure is shown. The terminal device shown in FIG. 6 is merely an example, and should not limit the function and scope of use of the embodiments of the present disclosure.

Figure 6:
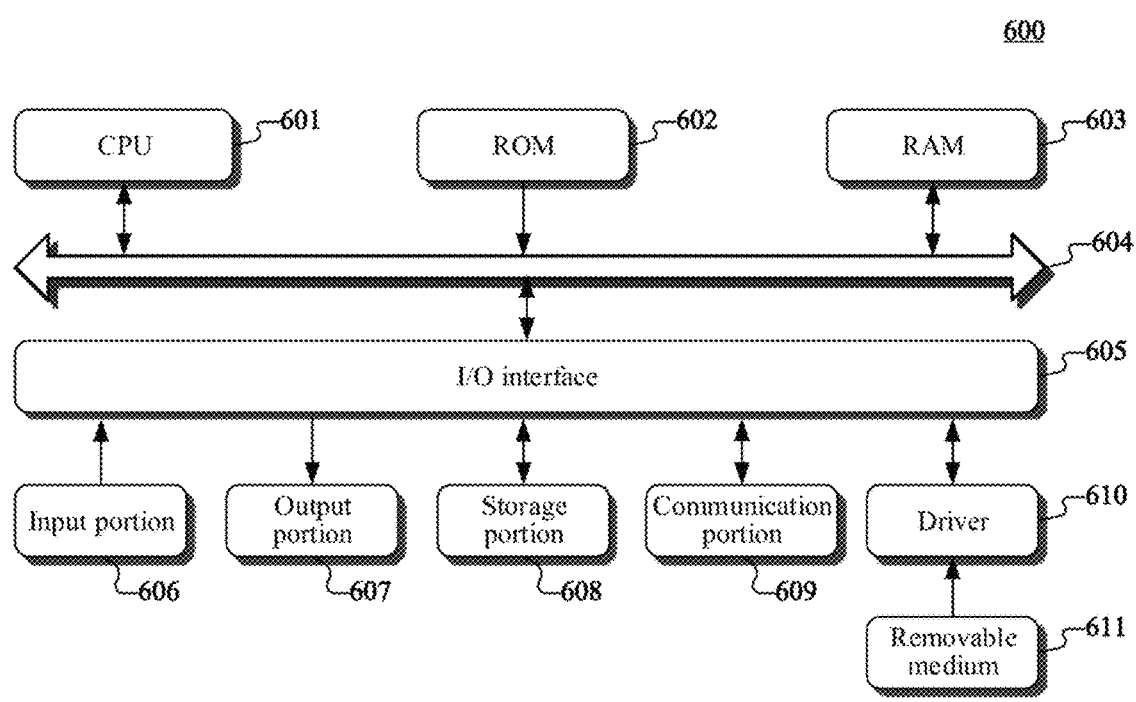
FIG. 6 is a schematic structural diagram of a computer system adapted to implement a terminal device of embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the computer system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which includes a computer program that is hosted in a machine-readable medium. The computer program includes program codes for executing the method as illustrated in the flow chart. In such an embodiment, the computer program may be downloaded and installed from a network via the communication portion 609, or may be installed from the removable medium 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising an acquiring unit, a first recognizing unit, an associating unit, a second recognizing unit and a processing unit. The names of these units or modules do not in some cases constitute a limitation to such units or modules themselves. For example, the acquiring unit may also be described as "a unit for acquiring an original speech."

In another aspect, some embodiments of the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquire an original speech; perform speech recognition on the original speech, to obtain an original text corresponding to the original speech; associate a speech segment in the original speech with a text segment in the original text; recognize an abnormal segment in the original speech and/or the original text; and process a text segment indicated by the abnormal segment in the original text and/or the speech segment indicated by the abnormal segment in the original speech, to generate a final speech.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for processing a speech, comprising:
   acquiring an original speech;
   performing speech recognition on the original speech, to obtain an original text corresponding to the original speech;
   associating a speech segment in the original speech with a text segment in the original text;
   recognizing an abnormal segment in at least one of the original speech or the original text;
   processing at least one of the text segment indicated by the abnormal segment in the original text or the speech segment indicated by the abnormal segment in the original speech, to generate a final speech;
   smoothing the final speech,
   wherein the smoothing the final speech comprises:
   determining, based on a volume and accents of the final speech, an emotion level corresponding to the final speech; and
   adjusting, based on the emotion level corresponding to the final speech, a speech rate, tone and accents of the final speech.

2. The method according to claim 1, wherein performing the speech recognition on the original speech to obtain the original text corresponding to the original speech comprises:
   in response to the original speech including at least one of a blank speech segment or an elongated tone speech segment, recognizing the blank speech segment as a first preset symbol and/or recognizing the elongated tone speech segment as a second preset symbol.

3. The method according to claim 2, wherein the blank speech segment is a speech segment in the original speech where a sound intensity thereof is smaller than a preset intensity, does not contain human characteristic acoustic waves, and a duration thereof is longer than a first preset duration, and wherein the elongated tone speech segment is a speech segment in the original speech where the sound intensity thereof is not smaller than the preset intensity, does not contain a semantic content, and a duration thereof is longer than a second preset duration.

4. The method according to claim 2, wherein the recognizing the blank speech segment as the first preset symbol, and/or recognizing the elongated tone speech segment as the second preset symbol comprises:
   determining, based on a ratio of a duration of the blank speech segment to a first preset duration, a number of the first preset symbol recognized from the blank speech segment; and/or
   determining, based on the ratio of a duration of the elongated tone speech segment to a second preset duration, a number of the second preset symbol recognized from the elongated tone speech segment.

5. The method according to claim 4, wherein processing at least one of the text segment indicated by the abnormal segment in the original text or the speech segment indicated by the abnormal segment in the original speech to generate the final speech comprises:
   deleting at least part of the text segment indicated by the abnormal segment in the original text, and synchronously deleting at least part of the speech segment in the original speech associated with the deleted at least part of the text segment, to generate the final speech.

6. The method according to claim 5, wherein deleting the at least part of the text segment indicated by the abnormal segment in the original text comprises:
   deleting, in response to the original text including at least one of the first preset symbol or the second preset symbol, at least one of the first preset symbol or the second preset symbol from the original text; and deleting, in response to the original text including a word repeated more than a preset number of times, the words except the word at a preset position from the original text.

7. The method according to claim 1, wherein the smoothing the final speech comprises:

determining, based on a speech feature of the final speech, a dialect category corresponding to the final speech; and correcting, based on the dialect category corresponding to the final speech, syllables in the final speech, and adjusting accents of the final speech.

8. The method according to claim 5, wherein the method further comprises:

synchronously revising, in response to detecting a revision operation on at least part of the text segment in the original text, at least part of the speech segment in the original speech associated with the revised at least part of the text segment.

9. The method according to claim 1, wherein the original speech is sent by a first user in an instant message application; and the method further comprises:

sending the final speech to a server of the instant message application, so that the server of the instant message application sends the final speech to a second user of the instant message application.

10. An apparatus for processing a speech, comprising:
at least one processor; and
a memory storing instructions, the instructions when executed by the at least one processor, cause the at least one processor to perform operations, the operations comprising:
acquiring an original speech;
performing speech recognition on the original speech, to obtain an original text corresponding to the original speech;
associating a speech segment in the original speech with a text segment in the original text;
recognizing an abnormal segment in at least one of the original speech or the original text;
processing at least one of the text segment indicated by the abnormal segment in the original text or the speech segment indicated by the abnormal segment in the original speech, to generate a final speech;
smoothing the final speech,
wherein the smoothing the final speech comprises:
determining, based on a volume and accents of the final speech, an emotion level corresponding to the final speech; and
adjusting, based on the emotion level corresponding to the final speech, a speech rate, tone and accents of the final speech.

11. The apparatus according to claim 10, wherein performing the speech recognition on the original speech to obtain the original text corresponding to the original speech comprises:

in response to the original speech including at least one of a blank speech segment or an elongated tone speech segment, recognizing the blank speech segment as a first preset symbol, and/or recognizing the elongated tone speech segment as a second preset symbol.

12. The apparatus according to claim 11, wherein the blank speech segment is a speech segment in the original speech where a sound intensity thereof is smaller than a preset intensity, does not contain human characteristic acoustic waves, and a duration thereof is longer than a first preset duration, and wherein the elongated tone speech segment is a speech segment in the original speech where the sound intensity thereof is not smaller than the preset intensity, does not contain a semantic content, and a duration thereof is longer than a second preset duration.

13. The apparatus according to claim 11, wherein the recognizing the blank speech segment as the first preset symbol, and/or recognizing the elongated tone speech segment as the second preset symbol comprises:

determining, based on a ratio of a duration of the blank speech segment to a first preset duration, a number of the first preset symbol recognized from the blank speech segment; and/or determining, based on the ratio of a duration of the elongated tone speech segment to a second preset duration, a number of the second preset symbol recognized from the elongated tone speech segment.

14. The apparatus according to claim 13, wherein the processing at least one of the text segment indicated by the abnormal segment in the original text or the speech segment indicated by the abnormal segment in the original speech to generate the final speech comprises:

deleting at least part of the text segment indicated by the abnormal segment in the original text, and synchronously deleting at least part of the speech segment in the original speech associated with the deleted at least part of the text segment, to generate the final speech.

15. The apparatus according to claim 14, wherein deleting the at least part of the text segment indicated by the abnormal segment in the original text comprises:

deleting, in response to the original text including at least one of the first preset symbol or the second preset symbol, at least one of the first preset symbol or the second preset symbol from the original text; and deleting, in response to the original text including a word repeated more than a preset number of times, the words except the word at a preset position from the original text.

16. The apparatus according to claim 10, wherein the smoothing the final speech comprises:

determining, based on a speech feature of the final speech, a dialect category corresponding to the final speech; and correcting, based on the dialect category corresponding to the final speech, syllables in the final speech, and adjusting accents of the final speech.

17. A non-transitory computer-readable medium, storing a computer program thereon, the computer program, when executed by a processor, causes the processor to implement operations, the operations comprising:

acquiring an original speech;
performing speech recognition on the original speech, to obtain an original text corresponding to the original speech;
associating a speech segment in the original speech with a text segment in the original text;
recognizing an abnormal segment in at least one of the original speech or the original text;
processing at least one of the text segment indicated by the abnormal segment in the original text or the speech segment indicated by the abnormal segment in the original speech, to generate a final speech; and
smoothing the final speech,
wherein the smoothing the final speech comprises:

determining, based on a volume and accents of the final speech, an emotion level corresponding to the final speech; and adjusting, based on the emotion level corresponding to the final speech, a speech rate, tone and accents of the final speech.

* * * * *